US005918063A

United States Patent [19]
Miyama et al.

[11] Patent Number: 5,918,063
[45] Date of Patent: *Jun. 29, 1999

[54] DATA DRIVEN TYPE INFORMATION PROCESSING APPARATUS INCLUDING PLURAL DATA DRIVEN TYPE PROCESSORS AND PLURAL MEMORIES

[75] Inventors: Ryuji Miyama, Tenri; Shinichi Yoshida, Kashihara; Tsuyoshi Muramatsu, Tenri; Souichi Miyata, Nara, all of Japan

[73] Assignee: Sharp Kabushiki Kaisha, Osaka, Japan

[ * ] Notice: This patent is subject to a terminal disclaimer.

[21] Appl. No.: 08/699,878

[22] Filed: Aug. 20, 1996

Related U.S. Application Data

[62] Division of application No. 08/141,207, Oct. 26, 1993, Pat. No. 5,586,281.

[30] Foreign Application Priority Data

Oct. 27, 1992 [JP] Japan ................................ 4-288733
Jan. 5, 1993 [JP] Japan .................................... 5-312

[51] Int. Cl.$^6$ ................................................ G06F 13/00
[52] U.S. Cl. .............................. 395/800.25; 395/800.25
[58] Field of Search ...................... 395/800.25, 800.26, 395/800.27

[56] References Cited

U.S. PATENT DOCUMENTS

| | | | |
|---|---|---|---|
| 4,814,978 | 3/1989 | Dennis ................................... | 395/377 |
| 4,907,187 | 3/1990 | Terada et al. ......................... | 395/377 |
| 4,918,644 | 4/1990 | Terada et al. ..................... | 395/200.81 |
| 4,922,418 | 5/1990 | Dolecek ............................. | 395/185.04 |
| 4,943,916 | 7/1990 | Asano et al. ...................... | 395/800.26 |
| 4,953,082 | 8/1990 | Nomura et al. ................... | 395/800.25 |
| 4,953,083 | 8/1990 | Takata et al. ......................... | 395/827 |
| 4,965,715 | 10/1990 | Yoshida ................................. | 395/377 |
| 4,972,315 | 11/1990 | Yamasaki et al. ...................... | 395/377 |
| 5,021,945 | 6/1991 | Morrison et al. ...................... | 395/392 |
| 5,043,880 | 8/1991 | Yoshida ................................. | 395/377 |
| 5,093,919 | 3/1992 | Yoshida ............................. | 395/800.25 |
| 5,115,510 | 5/1992 | Okamoto et al. .................. | 395/800.26 |
| 5,117,489 | 5/1992 | Komuri et al. ........................ | 395/377 |
| 5,117,499 | 5/1992 | Miyata .............................. | 395/800.26 |

(List continued on next page.)

FOREIGN PATENT DOCUMENTS

| | | |
|---|---|---|
| 6421538 | 1/1989 | Japan . |
| 2100778 | 4/1990 | Japan . |

OTHER PUBLICATIONS

"An Evaluation of Parallel–Processing in the Dynamic Data–Driven Type Processor" Translation of JP 64–21538.

*Primary Examiner*—Jack A. Lane

[57] ABSTRACT

A data flow information processing apparatus includes one or a plurality of data driven type processors for processing data packets based on a data flow program, one or a plurality of memories accessed by these processors, and a router receiving data packets processed by these data processors for selecting a path for selectively applying the data packet to any of the one or the plurality of memories. More preferably, a first router includes an address calculating unit for calculating the address based on the content of the data packet, and a branching unit for branching the path of the data packet based on the calculated address. The data packet includes a generation number allotted in accordance with the order of input time and data. The address calculating unit includes a unit for calculating a modified address by modifying the generation number based on the data. The address modifying unit may include a circuit for modifying the generation number with a prescribed global offset, and a circuit for calculating a locally offset address by further modifying the generation number with the data included in the applied data packet.

16 Claims, 13 Drawing Sheets

U.S. PATENT DOCUMENTS

| | | | |
|---|---|---|---|
| 5,125,097 | 6/1992 | Okamoto et al. | 395/800.25 |
| 5,165,036 | 11/1992 | Miyata et al. | 395/800.25 |
| 5,257,392 | 10/1993 | Okamoto | 395/800.26 |
| 5,327,569 | 7/1994 | Shima et al. | 395/800.26 |
| 5,335,324 | 8/1994 | Orimo et al. | 395/200.66 |
| 5,341,507 | 8/1994 | Terada et al. | 395/800.18 |
| 5,392,442 | 2/1995 | Komori et al. | 395/800.26 |
| 5,404,539 | 4/1995 | Onozaki | 395/728 |
| 5,404,558 | 4/1995 | Okamoto | 395/800.27 |
| 5,428,812 | 6/1995 | Yoshida | 395/377 |
| 5,452,464 | 9/1995 | Nomura et al. | 395/377 |
| 5,483,661 | 1/1996 | Yoshida et al. | 395/800.26 |
| 5,502,720 | 3/1996 | Muramatsu et al. | 370/412 |
| 5,542,080 | 7/1996 | Yoshida | 395/800.25 |
| 5,546,600 | 8/1996 | Miyamae et al. | 395/854 |
| 5,577,256 | 11/1996 | Muramatsu et al. | 395/800.27 |

DATA DRIVEN TYPE INFORMATION PROCESSING APPARATUS INCLUDING PLURAL DATA DRIVEN TYPE PROCESSORS AND PLURAL MEMORIES

This application is a divisional of application Ser. No. 08/141,207, filed on Oct. 26, 1993, now U.S. Pat. No. 5,586,281 the entire contents of which are hereby incorporated by reference.

BACKGROUND OF THE INVENTION

1. Field of the Invention

The present invention relates to a data driven type information processing apparatus and, more specifically, to a data driven type information processing apparatus including at least one data driven type processor, a plurality of memories and a router for connecting these.

2. Description of the Related Art

Recently, higher speed of operation of processors has been in strong demand in the field of image processing. Parallel processing is considered one promising means to meet such a demand of higher speed of operation of the processors. Among architectures suitable for parallel processing, an architecture called data driven type architecture is especially attracting attention.

In a data driven type processor, a process proceeds in accordance with a simple rule, that is, "a process is carried out as soon as all input data necessary for the process are collected and resources such as an arithmetic unit necessary for that a process are allocated." A mechanism for detecting the collection of the input data (firing) is one of the necessary techniques for implementing the architecture. A system which allows only one set of input data for a certain process at the time of detecting firing is referred to as a static data driven type system, while a system which allows two or more sets of input data is referred to as a dynamic data driven type system.

The static data driven type system cannot sufficiently cope with processing of time sequential data such as video signal processing, and it may be necessary to employ dynamic architecture system. At this time, since there are plural sets of input data for a certain process, it is necessary to introduce a concept of generation identifier or the like for identifying the plural sets of input data. In this specification, the generation identifier will be referred to as a generation number.

One example of the data driven type image processing apparatus suitable for video processing is disclosed in "An Evaluation of Parallel-Processing in the Dynamic Data-Driven Processor", (Information Processing Society of Japan, Microcomputer Architecture Symposium, Nov. 12, 1991).

FIG. 1 is a block diagram showing a structure of a conventional data driven type information processing apparatus suitable for video processing. The data driven type information processing apparatus of FIG. 1 includes a data driven type processor 51 suitable for video processing and a video memory 52.

Data packets having generation numbers allotted corresponding to the time-wise order of input are time sequentially input to data driven type processor 51 through a data transmission path 53. Data driven type processor 51 stores content of processing set in advance. Data driven type processor 51 processes the input data packets based on the preset content of processing.

When data driven type processor 51 accesses video memory 52 based on the preset content of processing (for example, when it refers to or updates the content of video memory 52), a data packet is provided to video memory 52 through data transmission path 54. A data packet output from video memory 52 as a result of that access is transmitted to data driven type processor 51 through a data transmission path 55. After the processing of the input data packet, data driven type processor 51 externally outputs the processed data packet through a transmission path 56.

FIG. 2 shows an example of a field configuration of a data packet input through data transmission path 54 to video memory 52. The data packet includes an instruction code (a), a generation number (b), data 1 (c), data 2 (d) and a processor number (e).

The instruction code (a) indicates the content of processing with respect to video memory 52. The content of processing includes, for example, reference to or updating of the contents in video memory 52. The generation number (b) is an identifier allotted, at the time of input, to the data packet input to data driven type processor 51 through data transmission path 53 in accordance with the order of input time sequence. Data driven type processor 51 utilizes the generation number (b) for matching of data. In video memory 52, an address to be accessed is determined in accordance with the generation number (b).

Data 1 (c) and data 2 (d) are operand data interpreted in accordance with the content of instruction code (a). When the instruction code (a) indicates update of video memory 52, for example, data 1 (c) is the data to be written to video memory 52, and data 2 (d) does not have any meaning. If the instruction code (a) indicates reference to video memory 52, data 1 (c) and data 2 (d) are meaningless.

The processor number (e) is an identifier indicating, when the data driven type information processing apparatus includes a plurality of data driven type processors the data driven type processor of which processor number is to be used for processing the data packet.

Here, data driven type processor 51 of FIG. 1 has a processor number PE#0 allotted thereto, and video memory 52 has a memory number VM#0.

In the data packet shown in FIG. 2, the instruction code (a) includes 8 bits, the generation number (b) includes 24 bits, data 1 (c) includes 12 bits, data 2 (d) includes 12 bits, and the processor number (e) includes 10 bits.

FIG. 3 shows an example of a field configuration of a data packet output from video memory 52 to data transmission path 55. The data packet includes an instruction code (f), a generation number (g), data 1 (h) and a processor number (i).

In the data packet, the instruction code (a), the generation number (b) and the processor number (e) of the data packet shown in FIG. 2 are stored as they are, as the instruction code (f), the generation number (g) and the processor number (i). The result of access to the video memory 52 is stored as data 1 (h).

FIG. 4 shows an example of detailed configuration of the generation number (b). As shown in FIG. 4, the generation number (b) includes a field address FD#, a line address LN# and a pixel address PX#.

In the example of FIG. 4, 3 bits are allotted for specifying the number of plane or field of video memory 52, 11 bits are allotted for specifying resolution in the vertical direction or lines of one plane, and 10 bits are allotted for specifying resolution in the horizontal direction or pixels of one plane. As for the allotment of bits, any number of bits may be set provided that the number of bits do not exceed the number of bits allotted for the generation number (b), that is, 24 bits in this example.

FIG. 5 shows logical structure of video memory 52 based on the grouping example of the generation number (b) shown in FIG. 4.

The logical structure of video memory 52 shown in FIG. 5 includes 8 video memories specified by a field address FD# of 3 bits. Each video memory includes $2^{11}$=2048 lines in the vertical direction corresponding to the line address LN# of 11 bits shown in FIG. 4. Each line includes $2^{10}$=1024 pixels corresponding to the pixel address PX# of 10 bits shown in FIG. 4.

A generation number has already been allotted, at the time of input, to the data packet input to data driven type processor 51 in accordance with the order of the input time sequence. If an address to be accessed of video memory 52 is determined based on the generation number, the access point starts from the upper left point of the first one of the video memories and moves to scan in the horizontal direction. When scanning of one line is completed, the access point moves to the left end of the immediately succeeding line. When scanning to the lower right point of the first one of the video memories is completed, the access point moves to the upper left point of the second one of the video memories. In the similar manner, the access point of the video memory moves to scan successively. When scanning to the lower right point of the last video memory, in this example the eighth video memory is completed, the access point returns to the upper left point of the first one of the video memories, and the same operation is repeated.

Now, in the conventional system shown in FIG. 1, only one data driven type processor 51 can be used. If the amount of required arithmetic operation is too large, the processing capability of only one data driven processor 51 may not be sufficient. Conversely, even if the data driven type processor has high operating capability, the capacity of processing of the system as a whole is defined or limited by the capacity of processing of the video memory 52. More specifically, the capacity of processing is limited in the conventional data driven type information processing apparatus shown in FIG. 1 since it includes only one data driven type processor 51 and only one video memory 52. Therefore, it may be preferable to provide a system including a plurality of data driven type processors or a plurality of video memories, or both.

However, in that case, if data packet output from the data driven type processors are branched to a plurality of video memories based on the generation numbers in the data packets, the destination of the data packet is determined by the order of input, and therefore the data packets cannot be transmitted to a desired video memory. Accordingly, in such a data driven type image processing apparatus in which access is dependent on the generation number of the data packet, it has been difficult to distribute processes by using a plurality of video memories.

In addition, it is also difficult to provide data packets output from the video memories to the target data driven type processors.

In such a multiprocessor system or in a system including a plurality of memories, if access not only to the address designated by the generation number but also to the neighborhood thereof and a desired address having a prescribed relation with the designated address in each video memory is enabled, it would be very convenient for an image processing system in which such a manner of accessing is used frequently. Since the target address is designated by the generation number as described above in the conventional system, such accessing has been impossible, and therefore a system allowing such processing with higher efficiency has been desired.

SUMMARY OF THE INVENTION

Therefore, an object of the present invention is to provide a data flow type information processing apparatus in which one or a plurality of memories can be shared by one or a plurality of data driven type processors.

Another object of the present invention is to enable transmission of a data packet from one data driven type processor to a desired one of a plurality of memories in a data driven type information processing apparatus, in which access is done based on the generation number in the data packet.

A further object of the present invention is to enable transmission of a data packet from each of a plurality of data driven type processors to a desired one of a plurality of memories in a data driven type information processing apparatus in which access is done based on the generation number.

An additional object of the present invention is, in a data driven type information processing apparatus in which access is done based on the generation number, to provide a data driven type processor which enables transmission of a data packet from each of a plurality of data driven type processors to a desired one of a plurality of memory cells, and further enables transmission of a data packet from each of the plurality of memories to a desired one of the plurality of data driven type processors.

A still further object of the present invention is, in a data driven type information processing apparatus in which access is done based on the generation number in the data packet, to enable transmission of a data packet from one data driven type processor to a desired one of a plurality of memories, and to enable access to a desired address having a prescribed relation with the generation number.

The data flow type information processing apparatus in accordance with the present invention includes one or a plurality of data driven type processors for processing data packets based on a data flow program, one or a plurality of memories accessed by the data driven type processor(s), and a first path selecting apparatus receiving the data packet processed by the data driven type processor(s) for selecting a path for selectively applying the data packet to any of the one or the plurality of memories. As the first path selecting apparatus is provided, a path of the data packet output from the data driven type processor to the target memory can be selected. One data driven type processor can be shared by a plurality of memories, one memory can be shared by a plurality of data driven type processors, and a plurality of data driven type processors can be shared by a plurality of memories. The number of data driven type processors or the number of memories can be readily increased in accordance with the amount of load.

More preferably, the first path selecting apparatus includes an address calculating unit for calculating the address to be accessed by the data packet in one or a plurality of memories based on the content of the data packet, and a branching unit for branching the path of the given data packet based on the address calculated by the address calculating unit.

Since the address is calculated in accordance with the content of the data packet and the path is branched so that the data packet reaches the target memory, the data packet can be transmitted to the desired memory.

More preferably, the first path selecting apparatus includes a plurality of address calculating units, a plurality of branching units and a junction unit for merging and outputting the outputs from the plurality of different branching units.

Since data packets from a plurality of data driven type processors can be transmitted to a certain memory, the memory can be shared by those data driven type processors.

According to another aspect of the present invention, the data packet includes data and a generation number allotted in accordance with the order of input time, and the address calculating unit includes an address modifying unit for calculating a modified address by modifying the generation number based on the data. The address modifying unit may include a circuit for modifying the generation number with a prescribed global offset, and a local offset modifying circuit for calculating an address which is locally offset by further modifying the generation number which has been modified by the global offset with the data included in the given data packet.

Since the memory can be accessed with the address based on the generation number and further modified by the offsets, an apparatus which is more convenient for neighborhood processing, which is frequently used in image processing, than the conventional data driven type information processing apparatus can be provided.

According to a further aspect of the present invention, the data driven type information processing apparatus includes a second path selecting apparatus receiving data packets output from one or a plurality of memories for selecting a path or applying the data packet selectively to any of the one or the plurality of data driven type processors.

Since a path for applying the data packet from the video memory to a desired one of the data driven type processors can be selected, the load of processing the data packets can be distributed to a plurality of data driven type processors.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 6:
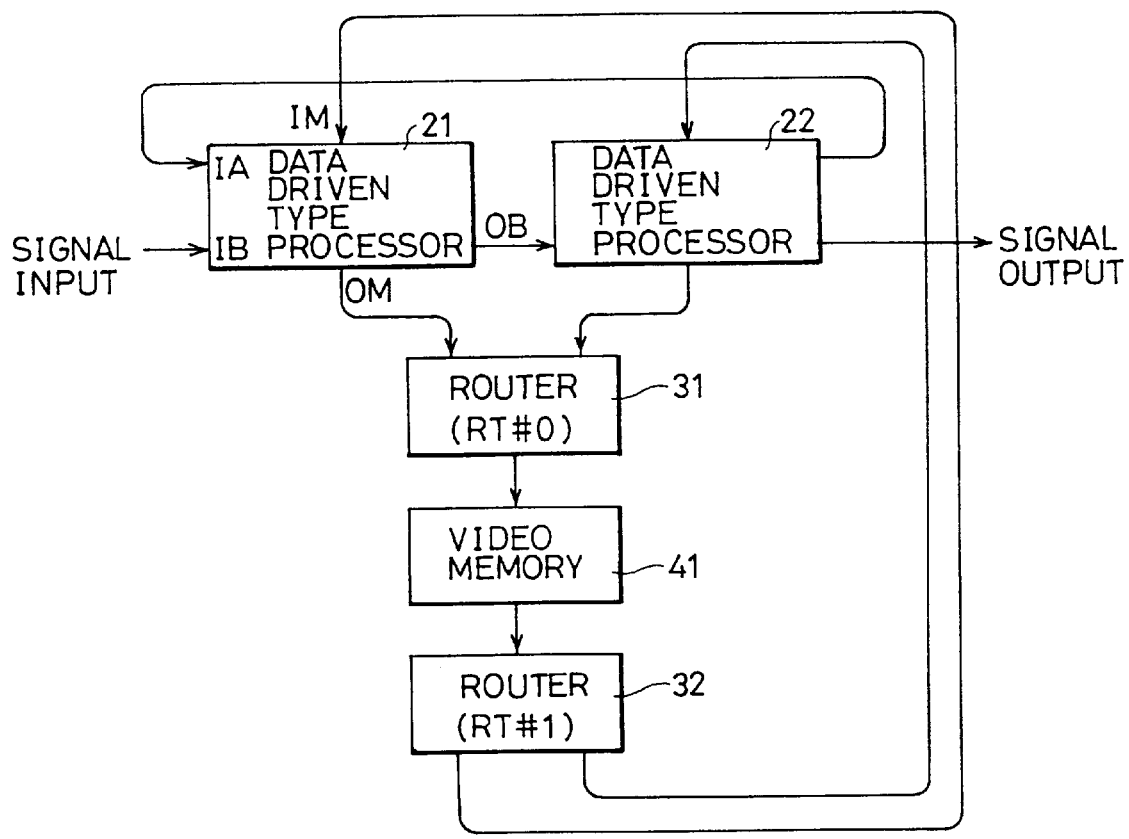
FIG. 6 is a block diagram showing an information processing apparatus of a multiprocessor system using a router in accordance with one embodiment of the present invention.

FIG. 6 shows a system in accordance with a first embodiment of the present invention. The system of the embodiment shown in FIG. 6 includes two data driven type processors 21 and 22, each of which can have access to one common video memory 41. Data driven type processor 21 has a processor number PE#0 allotted thereto, and data driven type processor 22 has a processor number PE#1 allotted thereto. Signal input packets having generation numbers allotted in accordance with the order of input time are externally input to data driven type processor 21 in time sequence. Data driven type processors 21 and 22 are also connected in series with each other and capable of transmitting data packets to and from each other.

Data driven type processors 21 and 22 provide data packets to a router 31 having a router number RT#0. Router 31 has a merging function and outputs the received data packet to video memory 41 no matter from which of the data driven type processors 21 and 22 the data packet has been transmitted. Video memory 41 carries out arithmetic processing of the input data packet and outputs the same to a router 32 having a router number RT#1. Router 32 has a branching function and applies the data packet which has been transmitted from video memory 41 to a prescribed one of the data driven type processors 21 and 22.

Data driven type processor 22 externally outputs the signal input packet, on which prescribed processes are all completed, as an output packet.

Figure 7:
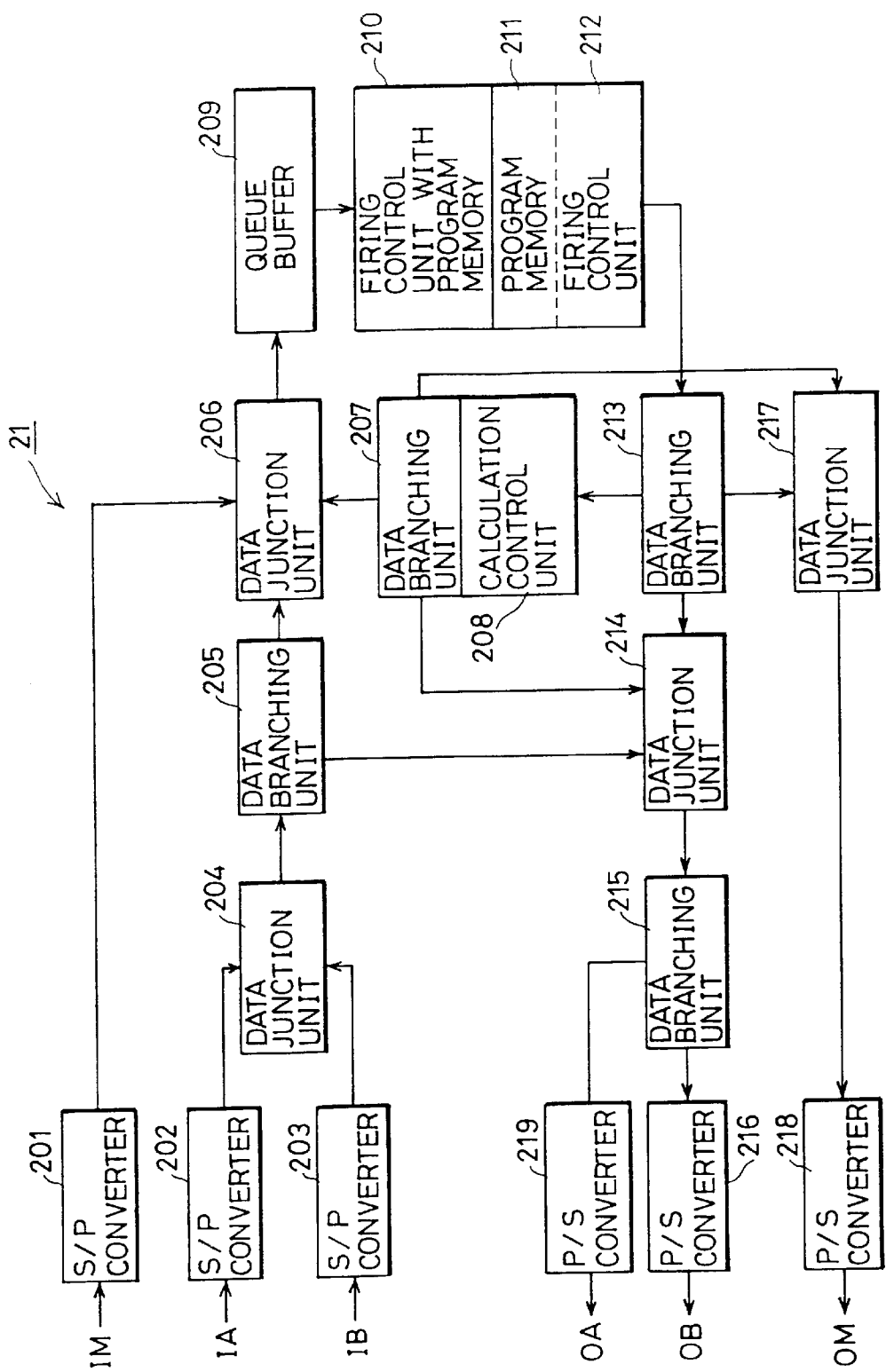
FIG. 7 is a block diagram in greater detail of the data driven type processor shown in FIG. 6.

FIG. 7 shows, in a block diagram, the structure of data driven type processor 21 shown in FIG. 6. Data driven type processor 22 has the same structure as data driven type processor 21. Data driven type processor 21 receives a signal input packet through an input terminal IB. An S/P (Serial-to-Parallel) converter 203 performs serial-to-parallel conversion so as to convert the data packet having a 2-word structure to a data packet of 1-word structure. S/P converter 203 applies the converted data packet to a data junction unit 204.

The data packet which has been returned from data driven type processor 22 to data driven type processor 21 shown in FIG. 6 is applied through an input terminal IA to S/P converter 202. S/P converter 202 converts the data packet having the 2-word structure to a data packet having a 1-word structure and applies the same to data junction unit 204.

Data junction unit 204 merges the data packets and applies the same to a data branching unit 205. Data branching unit 205 transmits a data packet which is not to be referred to by data driven type processor 21 to a data junction unit 214, and transmits only the data packet which is to be referred to, to a data junction unit 206.

The data packet applied from a router 32 shown in FIG. 6 is applied through an input terminal IM to S/P converter 201. S/P converter 201 effects serial-to-parallel conversion so as to convert a data packet having the 2-word structure to a data packet having the 1-word structure. The converted data packet is directly applied to data junction unit 206. The data packets merged at data junction unit 206 are stored in a queue buffer 209. A firing control unit 210 having a program memory includes a program memory unit 211 having a function particular to a data driven type processor for replacing instruction codes and destination information necessary for fetching the next instruction, and a firing control unit 212 which carries out detection as to whether the data necessary for the processing have been collected (firing).

When matching of necessary data is completed at firing control unit 210 having the program memory, the data packet including the data is applied to a data branching unit 213. Data branching unit 213 applies a data packet to be processed to a calculation control unit 208, a packet to be output to a data junction unit 214, and a data packet to be applied to the video memory to a junction unit 217. Calculation control unit 208 carries out arithmetic operation, logic operation or the like with respect to the data in the data packet in accordance with the instruction code in the applied data packet, and applies a data packet including the result of operation to data branching unit 207. Data branching unit 207 applies a data packet to be applied to firing control unit 210 having the program memory to data junction unit 206, applies a data packet to be output to data junction unit214, and a data packet to be applied to the video memory to data junction memory unit 217.

The data packet which has been transmitted from data branching unit 207 to data junction unit 206 is applied to queue buffer 209, fluctuation of the amount of packet flow is absorbed therein, and then it is again applied to firing control unit 210 having the program memory. These functions are arranged in accordance with the order of data processing on a circular self-timed pipeline.

The data packet applied to data junction unit 214 is applied to a P/S converting unit 216 through a data branching unit 215. P/S converting unit 216 converts the data packet having the 1-word structure to the data packet having the 2-word structure. The converted data packet is output to data driven type processor 22 shown in FIG. 6 through an output terminal OB.

In the data driven type processor 21 of this embodiment, output terminal OA is not used. P/S converting unit 219 is not used, either. Therefore, in FIG. 6, output terminal OA of data driven type processor 21 is not shown. However, in data driven type processor 21 in accordance with the second embodiment, which will be described later, P/S converting unit 219 and output terminal OA are used.

The data packet applied to data junction unit 217 is applied to a P/S converting unit 218. By P/S converting unit 218, the data packet having the 1-word structure is converted into a data packet having the 2-word structure. The converted data packet is output to a router 31 shown in FIG. 6 through an output terminal OM. As mentioned above, data driven type processor 22 has the same structure as data driven type processor 21. However, in the data driven type processor shown in FIG. 6, the input terminal IA (see FIG. 7) is not used, and therefore input terminal IA is not shown in FIG. 6.

Since the characteristic of this embodiment does not reside in the functions of data driven type processors 21 and 22, detailed description thereof will not be given here.

Figure 8:
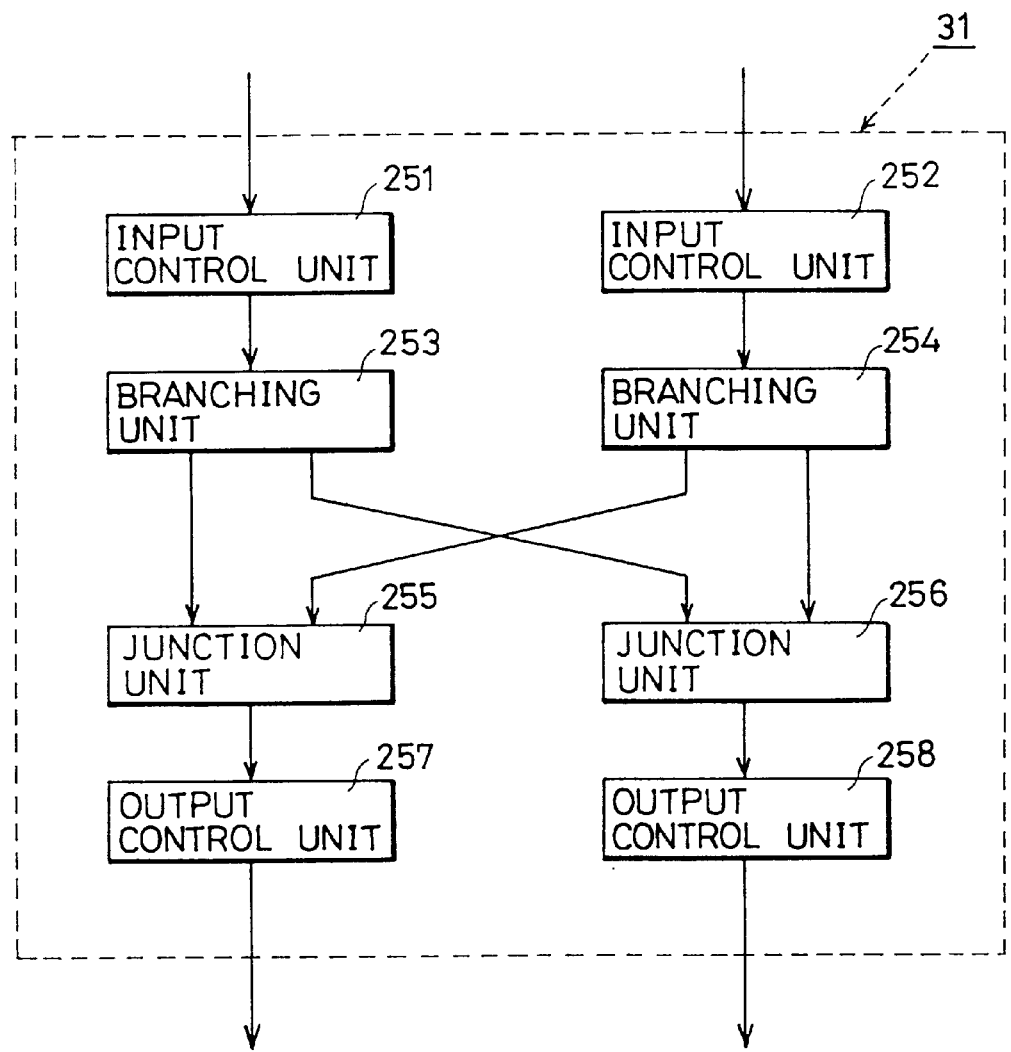
FIG. 8 is a block diagram in greater detail of the router shown in FIG. 6.

Routers 31 and 32 shown in FIG. 6 have the same structure. Referring to FIG. 8, router 31 includes input control units 251 and 252, branching units 253 and 254, junction units 255 and 256r and output control units 257 and 258.

Input control units 251 and 252 take in externally transmitted data packets and apply the data packet to branching units 253 and 254, respectively. Each of the branching units 253 and 254 applies the data packet to either junction unit 255 or 256 based on the generation number included in the data packet. Namely, branching units 253 and 254 have a function of branching the data packet.

Each of the junction units 255 and 256 has two inputs, merges the data packet applied to the two inputs, and provides the result to a corresponding one of the output control units 257 and 258. Each of the output control units 257 and 258 outputs the applied data packet to one transmission path. In the case of router 31 shown in FIG. 8, the output from output control unit 257 is connected to video memory 41. The output of output control unit 258 is not connected to anywhere. This is why there is only one output of router 31 shown in FIG. 6.

When it is necessary to merge data packets to be transmitted to one video memory 41 as shown in FIG. 6, branching units 253 and 254 both provide the data packets only to junction unit 255.

Router 32 shown in FIG. 6 has the same structure as that shown in FIG. 8. However, in router 32, the input of input control unit 252 is not connected to anywhere. An input of input control unit 251 is connected to the output of video memory 41. This is why only one input of router 32 is shown in FIG. 6.

Routers 31 and 32 have different functions, that is, the function of merging the applied data packets and of branching the applied data packet. Accordingly, the routers may have different structures. However, if these routers are formed to have the same structure, the router can be used for general purpose.

Figure 3:
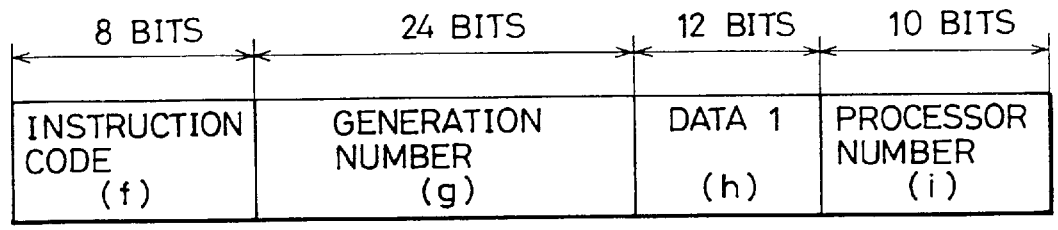
FIG. 3 shows a field configuration of a data packet output from the video memory shown in FIG. 1.

If branching to two transmission paths is necessary as in the case of router 32, the branching condition of branching unit 253 may be set such that when the least significant bit of the processor number indicated as the processor number i in FIG. 3 of the data packet is "0", it should be output to junction unit 255, and when the least significant bit is "1", it should be output to junction unit 256, for example. If it is necessary to branch the data packet also at the branching unit 254, the branching condition of branching unit 254 is set in the similar manner.

At router 31, the data packet applied from branching unit 253 or 254 to junction unit 255 is transmitted to output control unit 257 and further to the video memory 41. At router 32, the data packet which has been selectively applied from branching unit 253 to junction unit 255 or 256 is output to data driven type processor 21 or 22 through output control unit 257 or 258.

In the foregoing, an example has been described in which two data driven type processors 21 and 22 are used as shown in FIG. 6. When three or more data driven type processors are to be used, one video memory can be accessed from a plurality of data driven type processors by using routers shown in FIG. 8 in combination. Therefore, when the amount of operation required for a data driven type processor is too large to be processed by only one data driven type processor, a plurality of data driven type processors may be used to distribute the load to these processors. Such a multiprocessor system can be more easily formed by the router such as shown in FIG. 8.

More preferably, if the router is provided with the function of modification calculation, a plurality of video memories can be used, and when the capacity of processing of one video memory is not sufficient, a plurality of video memories may be used to distribute the load of processing. A second embodiment described in the following shows a specific example.

Figure 9:
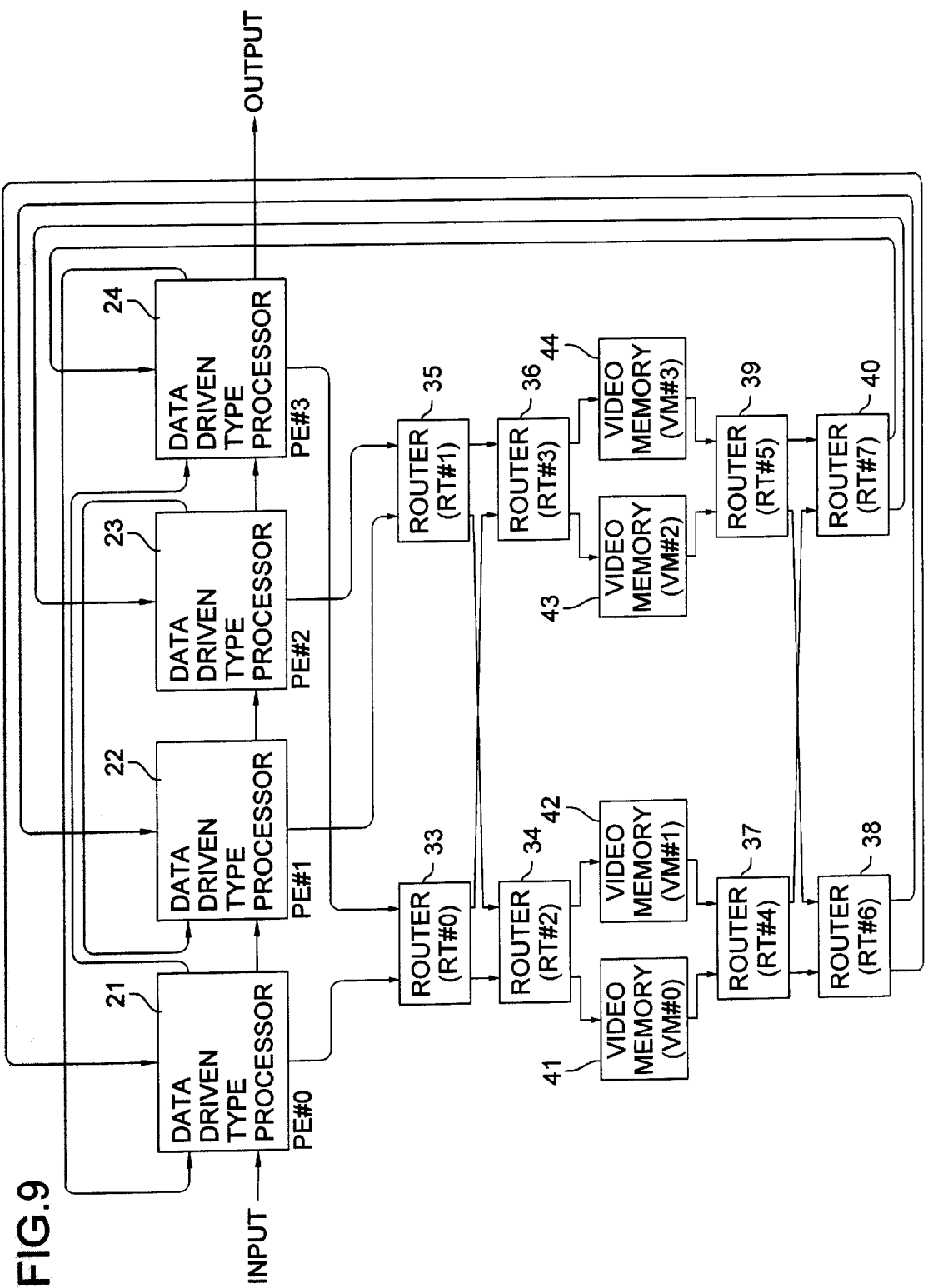
FIG. 9 is a block diagram showing a structure of data driven type information processing apparatus in accordance with one embodiment of the present invention.

Referring to FIG. 9, the data driven type processing apparatus in accordance with the second embodiment of the present invention includes four data driven type processors 21, 22, 23 and 24, eight routers 33, 34, 35, 36, 37, 38, 39 and 40, and four video memories 41, 42, 43 and 44. Namely, the data driven type information processing apparatus shown in FIG. 9 is a multiprocessor system.

Data driven type processors 21 to 24 have processor numbers PE#0 to PE#3, respectively. Routers 33 to 40 have router numbers RT#0 to RT#7, respectively. Video memories 41 to 44 have memory numbers VM#0 to VM#3, respectively. Data driven type processor 21 is the same as data driven type processor 21 of the first embodiment shown in FIGS. 6 and 7. However, it should be noted that the output terminal OA shown in FIG. 7 is connected to input terminal IA of data driven type processor 24 in this second embodiment. Data driven type processor 22 is the same as data driven type processor 22 of the first embodiment shown in FIG. 6. However, it should be noted that input terminal IA shown in FIG. 7 is connected to output terminal OA of data driven type processor 23 in this second embodiment. Data driven type processors 23 and 24 have the same structure as data driven type processors 21 and 22.

Data packets for memory access output from data driven type processors 21 and 24 are applied to router 33, while data packets for memory access output from data driven type processors 22 and 23 are applied to router 35. Each of the routers 33 and 35 has a merging function and a branching function. More specifically, router 33 branches the data packets applied from data driven type processors 21 and 24 to router 34 or router 36. Similarly, router 35 branches the data packets applied from data driven type processors 22 and 23 to router 34 or router 36. Each of the routers 33 and 35 further has a global offset modification calculation function and address modification calculation function, which will be described later.

Each of the routers 34 and 36 has the merging function and the branching function as well as the global offset modification calculation function and the address modification calculation function. Router 34 branches the data packets applied from routers 33 and 35 to video memory 41 or 42. Similarly, router 36 branches data packets applied from routers 33 and 35 to video memory 43 or 44.

Data packets output from video memories 41 and 42 are applied to router 37, and data packets output from video memories 43 and 44 are applied to router 39.

Each of the routers 37 and 39 has the merging function and the branching function. Router 37 branches data packets applied from video memories 41 and 42 to router 38 or 40. Similarly, router 39 branches data packets applied from video memories 43 and 44 to router 38 or 40.

Each of the routers 38 and 40 also has the merging function and the branching function. Router 38 branches data packets applied from routers 37 and 39 to data driven type processor 21 or 22. Similarly, router 40 branches data packets applied from routers 37 and 39 to data driven type processor 23 or 24.

The data packet processed in data driven type processor 21 may be applied to data driven type processor 22 or may be applied to data driven type processor 24. The data packet processed in data driven type processor 22 may be applied to data driven type processor 23. The data packet processed in data driven type processor 23 may be applied to data driven type processor 22 or it may be applied to data driven type processor 24. The data packet processed in data driven type processor 24 may be applied to data driven type processor 21 or it may be externally output.

In the data driven type information processing apparatus shown in FIG. 9, the data packet externally input to data driven type processor 21 is transmitted to a plurality of data driven type processors, a plurality of routers and a plurality of video memories based on the generation number or the processor number, and circulates in the data driven type information processing apparatus. Meanwhile, the data packet is subjected to prescribed processes, and when all the prescribed processes are completed, the data packet including the result of the processes is externally output from data driven type processor 24.

When a process requiring access to video memory 41, 42, 43 or 44 (reference to or update of the memory) is to be carried out in data driven type processor 21, 22, 23 or 24, the data packet is applied to the desired one of the video memories 41, 42, 43 and 44 through one of the routers 33 and 34 and one of the routers 35 and 36. The data packet output from video memory 41, 42, 43 or 44 is applied to a desired one of data driven type processors 21, 22, 23 and 24 through one of the routers 37 and 39 and one of the routers 38 and 40.

Data driven type processors 21, 22, 23 and 24 each have the structure shown in FIG. 7. Therefore, detailed description of the structure and operation is not repeated here.

Referring to FIG. 7, in data driven type processors 21, 23 and 24 of the present embodiment, the data packet provided from data branching unit 215 to output terminal OA is converted to a data packet having the 2-word structure by a P/S converting unit 219 and applied to data driven type processors 24, 22 and 21 shown in FIG. 9, respectively. The input terminal IA of data driven type processor 22 is connected to output terminal OA of data driven type processor 23. Input terminal IA of data driven type processor 23 is not used.

Figure 10:
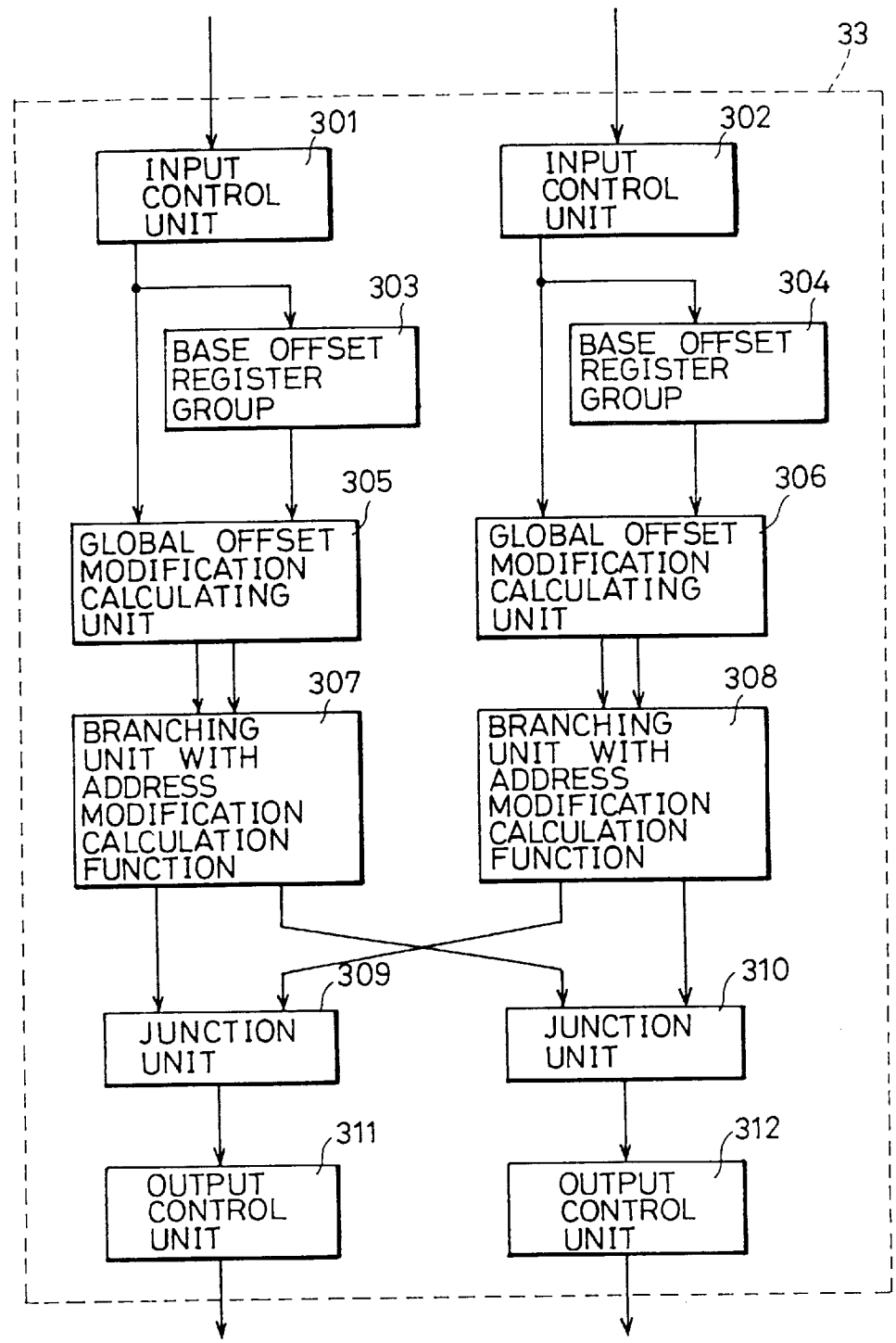
FIG. 10 is a block diagram showing a structure of one router included in the data driven type information processing apparatus of FIG. 9.

Referring to FIG. 10, router 33 shown in FIG. 9 includes input control units 301 and 302, base offset register groups 303 and 304, global offset modification calculating units 305 and 306, branching units 307 and 308 having address modification calculating function, junction units 309 and 310, and output control units 311 and 312. Routers 34 to 36 have the same structure as shown in Fig. 10.

Input control units 301 and 302 take in data packets applied from data driven type processors 21 and 24 shown in FIG. 9, respectively, and apply the data packets to global offset modification calculating units 305 and 306, respectively. Base offset data are prestored in base offset register groups 303 and 304, in accordance with a base offset register setting instruction.

Global offset modification calculating units 305 and 306 perform global offset modification calculation on the generation numbers of the data packets applied from input control units 301 and 302, based on the base offset data stored in base offset register groups 303 and 304, respectively. Global offset modification calculating units 305 and 306 apply the input data packet to branching units 307 and 308 having address modification calculating function, and apply the results of global offset modification calculation to the branching units 307 and 308 having the address modification calculating function, respectively.

The branching units 307 and 308 having the address modification calculating function carry out address modification calculation on the applied results of global offset modification calculation, based on data 2 (d) (offset modifier) of the input data packets. The branching units 307 and 308 having the address modification calculating function branch the input data packet to junction unit 309 or 310 based on the results of these address modification calculations.

Junction unit 309 merges the data packet applied from branching units 307 and 308 having the address modification calculating function, and applies the result to output control unit 311 in a prescribed order. Similarly, junction unit 310 merges data packet applied from branching units 307 and 308 having the address modification calculating function, and applies the result to output control unit 312 in a prescribed order.

Output control unit 311 outputs the applied data packet to router 34 shown in FIG. 9, while the output control unit 312 outputs the applied data packet to router 36.

In routers 37, 38, 39 and 40 shown in FIG. 9, the global offset modification calculation and the address modification calculation are not necessary, and therefore base offset registers 303 and 304 and global offset modification calculating units 305 and 306 are not provided. In addition, branching units not having the address modification calculating function are provided in place of the branching units 307 and 308 having the address modification calculating function.

Figure 11:
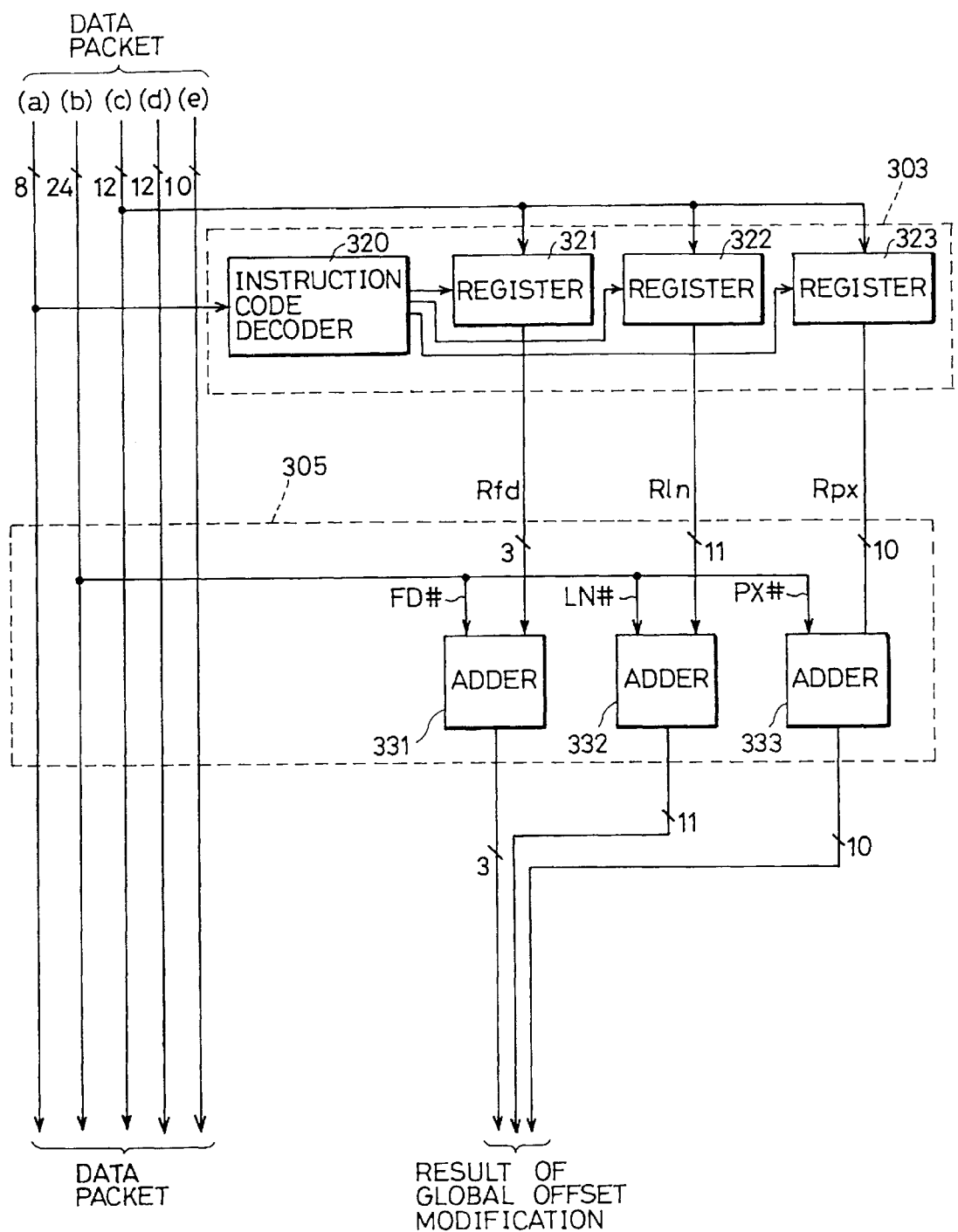
FIG. 11 is a block diagram showing detailed structures of a base offset register group and a global offset modification calculating unit included in the router of FIG. 10.

FIG. 11 is a block diagram showing detailed structures of base offset register group 303 and global offset modification calculating unit 305 shown in FIG. 10. Structures of base offset register group 304 and global offset modification calculating unit 306 are the same as those shown in FIG. 11.

Base offset register group 303 includes an instruction code decoder 320 and three registers 321, 322, and 323. An instruction code (a) of the input data packet is applied to instruction code decoder 320. Instruction code decoder 320 decodes the instruction code (a) and when the instruction code (a) indicates a base offset register setting instruction, applies an enable signal to registers 321, 322 and 323. Consequently, data 1 (c) of the data packet is stored as the base offset data in registers 321, 322 and 323.

The base offset data includes a base field offset value Rfd, a base line offset value Rln and a base pixel offset value Rpx. Base field offset value Rfd is stored in register 321, base line offset value Rln is stored in register 322, and base pixel offset value Rpx is stored in register 323.

Global offset modification calculating unit 305 includes three adders 331, 332 and 333. A field address FD# of the generation number (b) is applied to one input terminal of adder 331, a line address LN# of the generation number (b) of the data packet is applied to one input terminal of adder 332, and a pixel address PX# in the generation number (b) of the data packet is applied to one input terminal of address 333. The base field offset value Rfd output from register 321 is applied to the other input terminal of adder 331, the base line offset value Rln output from register 322 is applied to the other input terminal of adder 332, and the base pixel offset value Rpx output from register 323 is applied to the other input terminal of adder 333.

Adder 331 adds field address FD# and base field offset value Rfd and outputs the result of addition. Adder 322 adds line address LN# and base line offset value Rln, and outputs the result of addition. Adder 333 adds pixel address PX# and base pixel offset value Rpx, and outputs the result of addition. Outputs from adders 331, 332, and 333 are applied as the result of global offset modification to the branching unit 307 having the address modification calculating function shown in FIG. 10.

Figure 12:
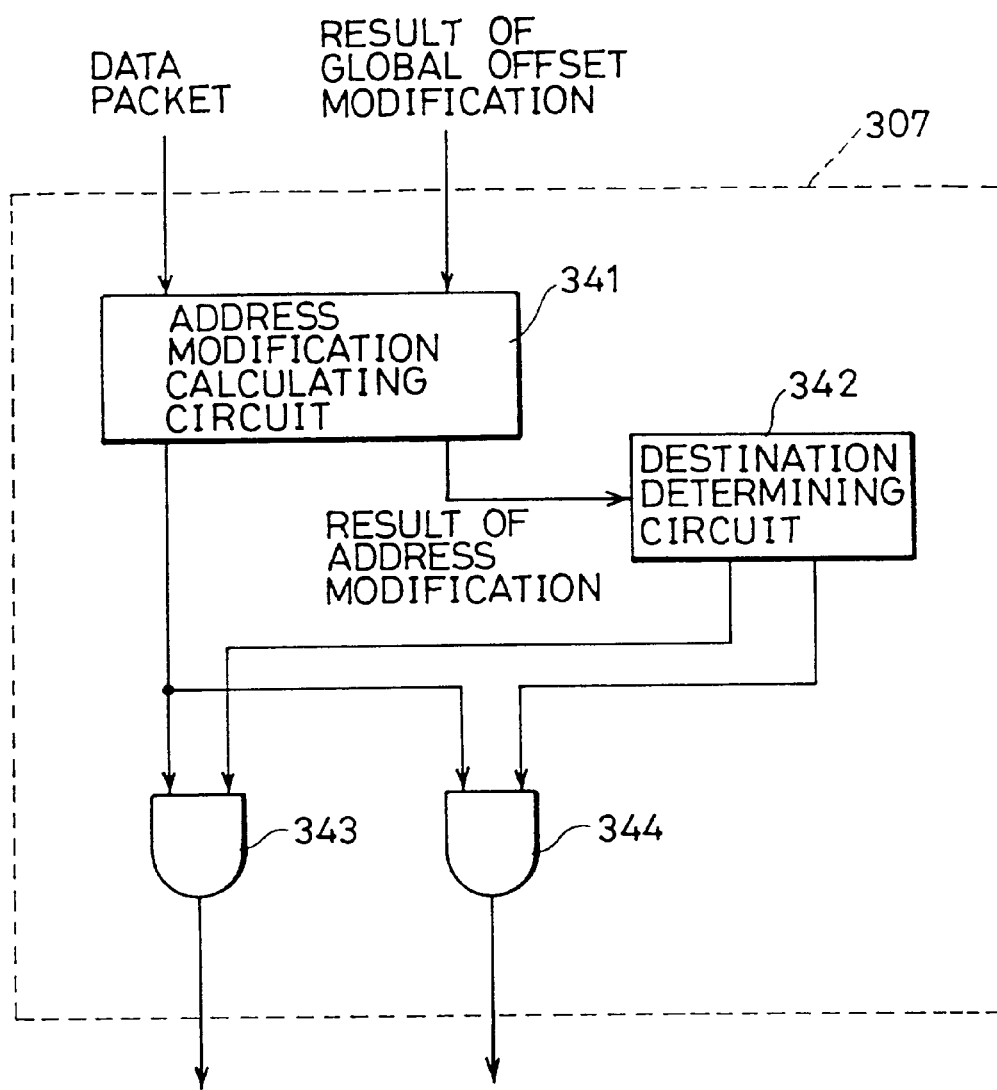
FIG. 12 is a block diagram showing a structure of a branching unit having address modification calculating function included in the router of FIG. 10.

FIG. 12 is a block diagram showing the structure of branching unit 307 having the address modification calculating function shown in FIG. 10. Branching unit 308 having the address modification calculating function shown in FIG. 10 has the same structure as that of FIG. 12.

Branching unit 307 having address modification calculating function includes an address modification calculating circuit 341, a destination determining circuit 342 and AND circuits 343 and 344.

To address modification calculating circuit 341, an input data packet and result of global offset modification provided from global offset modification calculating unit 305 are applied. Address modification calculating circuit 341 carries out address modification calculation on the result of global offset modification based on data 2 (d) (offset modifier) in the data packet, and applies the result of calculation to destination determining circuit 342 as the result of address modification.

Address modification calculating circuit 341 outputs the input data packet as it is to AND gates 343 and 344. Destination determining circuit 342 activates either the AND gate 343 or 344 based on a prescribed bit of the result of address modification. Consequently, a data packet is output from the activated AND gate.

For example, destination determining circuit 342 determines whether the least significant bit of the result of address modification is "1" or "0". If the least significant bit is "1", destination determining circuits 342 activates AND gate 343, and if the least significant bit is "0", it activates AND gate 344.

The data packet output from AND gate 343 is applied to junction unit 309 shown in FIG. 10, while the data packet output from AND gate 344 is applied to junction unit 310 shown in FIG. 10.

Figure 13:
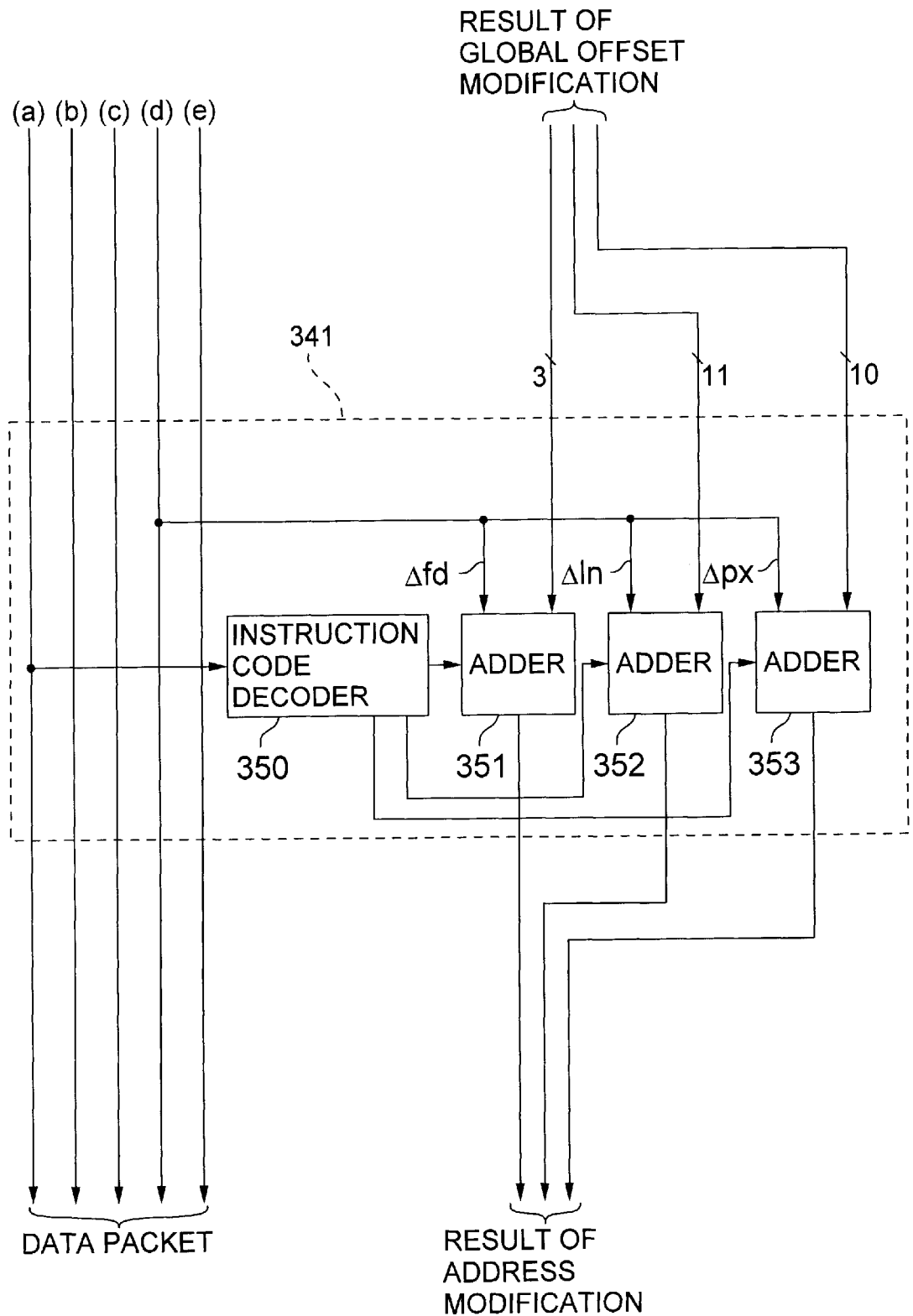
FIG. 13 is a block diagram showing a detailed structure of the address modification calculating circuit shown in FIG. 12.

FIG. 13 is a block diagram showing a detailed structure of address modification calculating circuit 341 shown in FIG. 12.

Address modification calculating circuit 341 includes an instruction code decoder 350 and three adders 351, 352 and 353. An instruction code (a) of the input data packet is applied to instruction code decoder 350. Instruction code decoder 350 decodes the instruction code (a), and when the instruction code (a) is an address modification calculating instruction, applies an enable signal to adders 351, 352 and 353.

Applied to adders 351, 352 and 353 are data 2 (d) (offset modifier) of the input data packet and the result of global offset modification output from global offset modification calculating unit 305 shown in FIG. 11.

Figure 14:
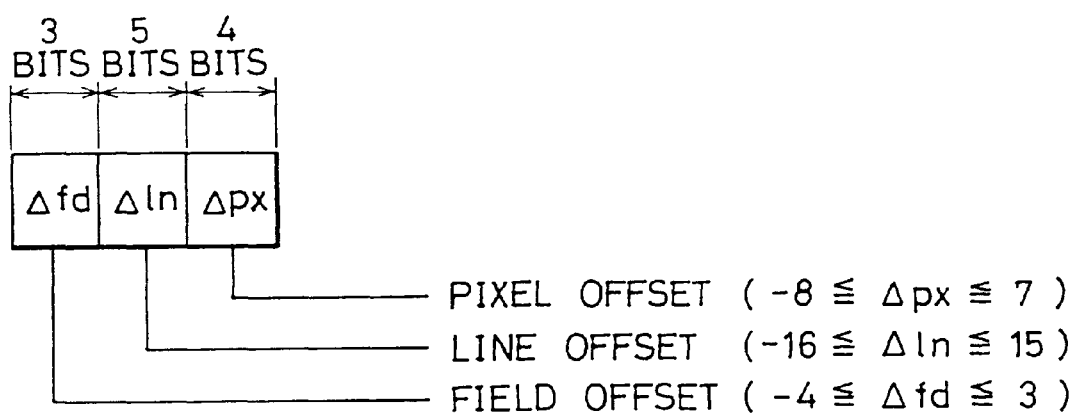
FIG. 14 shows a field configuration of data 2 (d) in the data packet.

Referring to FIG. 14, 3 bits of the data 2 (d) are allotted to a field offset value Δfd, 5 bits are allotted to the line offset value Δln, and 4 bits are allotted to the pixel offset value Δpx. The number of bits may be arbitrarily set within the number of bits allotted for the data 2 (d), that is, 12 bits in this example. Each offset value is stored in the form of a signed integer in the area allotted thereto.

Again referring to FIG. 13, a field offset value Δfd is applied to one input terminal of adder 351, the line offset value Δln is applied to one input terminal of adder 352, and the pixel offset value Δpx is applied to one input terminal of adder 353. An output from adder 331 shown in FIG. 11 is applied to the other input terminal of adder 351, an output from adder 332 shown in FIG. 11 is applied to the other input terminal of adder 352, and an output of adder 333 shown in FIG. 11 is applied to the other input of adder 353. Adders 351, 352 and 353 add the field offset value Δfd, the line offset value Δln and the pixel offset value Δpx to the corresponding result of global offset modification, respectively, in response to the enable signal from instruction code decoder 350, and output the results of addition as the result of address modification. When the enable signal from instruction code decoder 350 is not applied, adders 351, 352 and 353 output the result of global offset modification as the result of address modification.

The results of address modification provided from address modification calculating circuit 341 is applied to destination determining circuit 342 (see FIG. 12).

By setting an appropriate branching condition in destination determining circuit 342 shown in FIG. 12, the manner of branching the data packet at the router can be changed arbitrarily.

Figure 5:
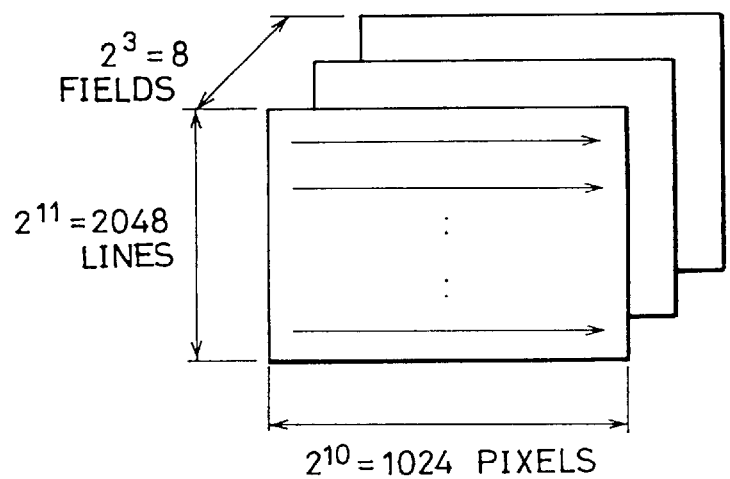
FIG. 5 shows an example of logical structure of a video memory based on the example of grouping of the generation number shown in FIG. 4.

For example, in such a logic structure of the video memory as shown in FIG. 5, assume that, for 8 fields having the field numbers 0 to 7, data packets are transmitted to video memory 41 for the fields having the field number 0 (000 in binary notation) and the field number 4 (100 in binary notation); data packets are transmitted to video memory 42 for the fields having the field number 1 (001 in binary notation) and 5 (101 in binary notation); data packets are transmitted to video memory 43 for the fields having the field number 2 (010 in binary notation) and 6 (110 in binary notation) and data packets are transmitted to video memory 44 for the fields having the field number 3 (011 in binary notation) and 7 (111 in binary notation).

In that case, for the routers 33 and 35, branching conditions at branching units 307 and 308 shown in FIG. 10 are set as follows: "when the second least significant bit of the field address of the generation number after address modification is '0', data packet should be branched to junction unit 309, and when it is '1', the data packet should be branched to junction unit 310". As for routers 34 and 36, the branching condition at the branching units 307 and 308 shown in FIG. 10 are set as follows: "when the least significant bit of the field address of the generation number after address generation is '0', data packet should be branched to junction unit 309, and when it is '1', data packet should be branched to junction unit 310."

In order to set the branching condition in the above described manner, a bit which corresponds to the field address out of the result of address modification output from address modification calculating circuit 341 is applied to destination determining circuit 342 shown in FIG. 12.

Destination determining circuit 342 in the branching units 307 and 308 having address modification calculating function of routers 33 and 35 determines whether the second least significant bit of that portion of the result of address modification which corresponds to the field address is "0" or "1". Destination determining circuit 342 of branching units 307 and 308 having address modification calculating function of routers 34 and 36 determines whether or not the least significant bit of that portion of the result of address modification which corresponds to the field address is "0" or "1".

In this manner, the data packets can be branched to video memories 41, 42, 43 and 44 in the above described manner.

In the above example, load of the video memories to be accessed is distributed based on the field number. However, load distribution of the video memory may be performed based on the line number or the pixel number.

Each of video memories 41, 42, 43 and 44 shown in FIG. 9 is provided with the base offset register group and the global offset modification calculating unit having similar structures as the base offset register group 303 and the global offset modification calculating unit 305 shown in FIG. 11, and it is also provided with an address modification calculating circuit having the similar structure as address modification calculating circuit 341 shown in FIG. 13.

In the base offset register group of each video memory, base offset data including the base field offset value Rfd, the base line offset value Rln and the base pixel offset value Rpx are prestored in accordance with a base offset register setting instruction.

Therefore, in each video memory, global offset modification is carried out on the generation number (b) of the input data packet based on the base offset data, and address modification is carried out based on data 2 (d) (offset modifier) of the input data packet. Consequently, the effective address to be accessed is determined in each video memory.

Figure 15:
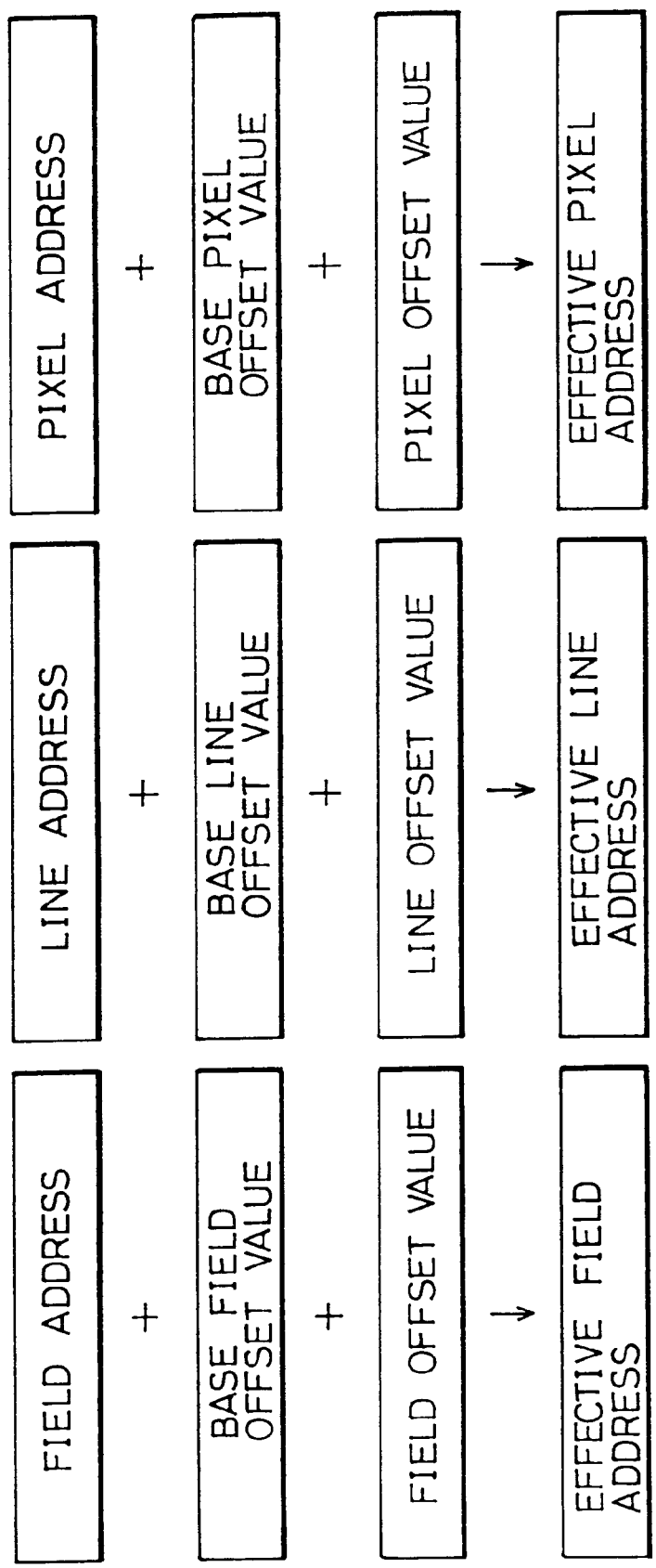
FIG. 15 shows a method of determining an effective address of the video memory by using the global offset modification calculation and the address modification calculation.
Figure 16:
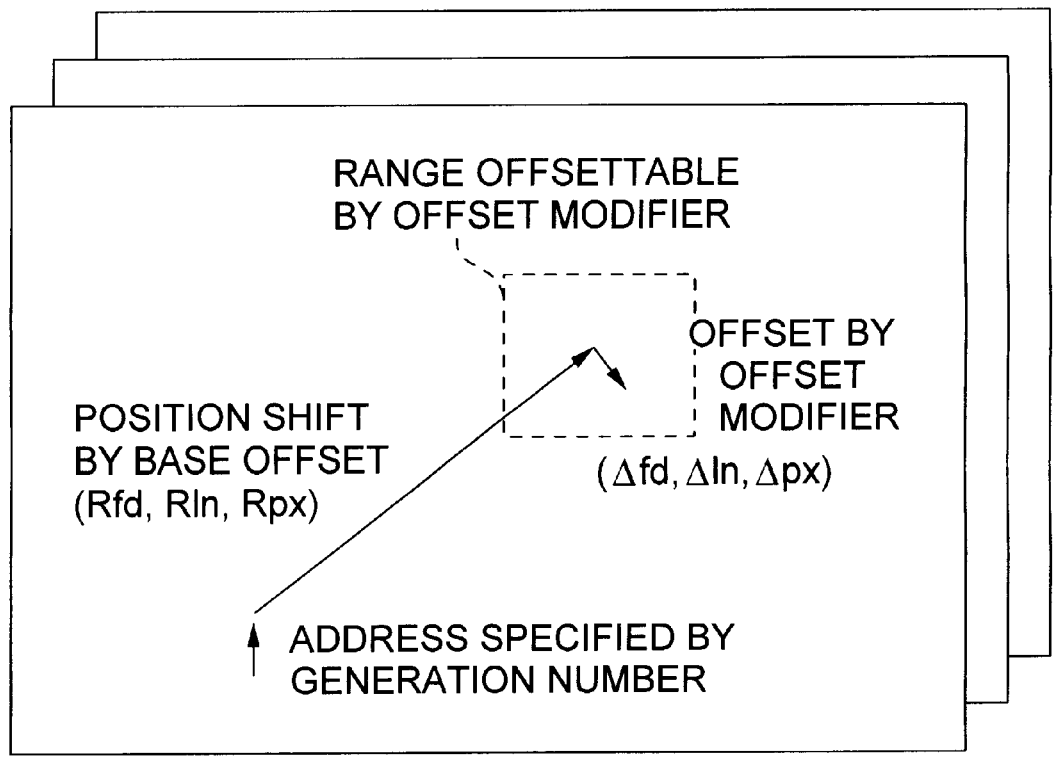
FIG. 16 shows a method of determining an effective address of the video memory by using the global offset modification calculation and the address modification calculation.

FIGS. 15 and 16 show methods of determining the effective address by using the global offset modification based on the base offset data and address modification based on the offset modifier.

Figure 4:
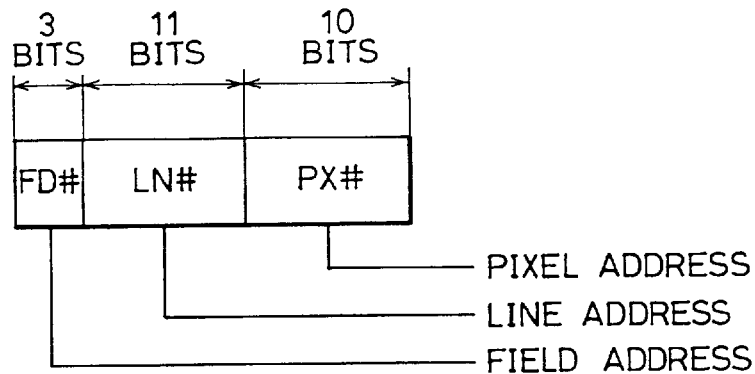
FIG. 4 shows a field configuration of the generation number in the data packet.

To the field address FD#, the line address LN# and the pixel address PX# included in the generation number (b) (see FIG. 4) of the input data packet, the base field offset value Rfd, the base line offset value Rln and the base pixel offset value Rpx set in the base offset register group in the video memory are added respectively. To the results of addition, the field offset value Δfd, the line offset value Δln and the pixel offset value Δpx included in data 2 (d) (offset modifier) of the input data packet are added respectively. The results of addition will be the effective field address, the effective line address and the effective pixel address.

Figure 1:
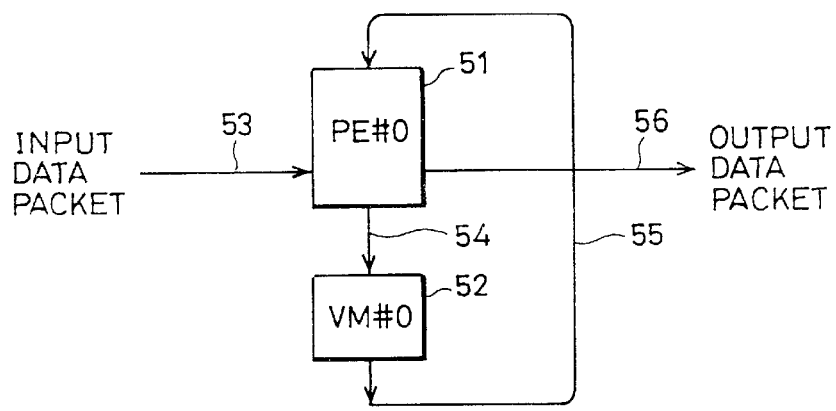
FIG. 1 is a block diagram showing the structure of a conventional data driven type information processing apparatus.
Figure 2:
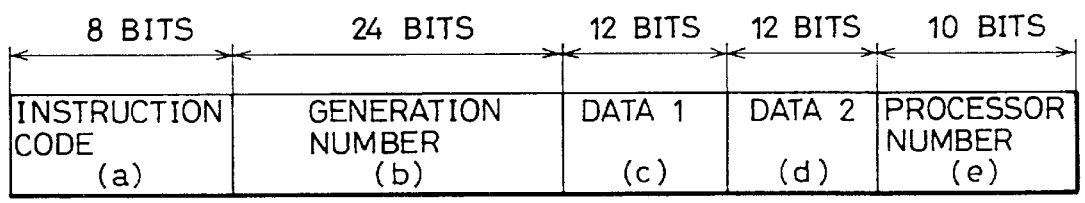
FIG. 2 shows a field configuration of a data packet input to the video memory shown in FIG. 1.

As can be seen from FIG. 16, since the access position is shifted by the global offset modification based on the base offset data and then address modification based on the offset modifier is carried out, address near the shifted address from the original address indicated by the generation number can be accessed. The generation number (g) in the data packet (see FIG. 3) output from each of the video memories 41, 42, 43 and 44 is the same as the generation number (b) of the data packet (see FIG. 2) input to that video memory.

In each of the routers 37, 38, 39 and 40 shown in FIG. 9, a data packet is branched to any of data driven type processors 21, 22, 23 and 24 based on the processor number (i) (see FIG. 3) in the input data packet. In order to transmit the data packet to the data driven type processor having the processor number indicated by the processor number (i), the destination is determined based on the least and second least significant bits of the processor number (i), as in the case of routers 33, 34, 35 and 36.

In the data driven type information processing apparatus of the above described embodiment, each of the routers 33, 34, 35 and 36 has the function of global offset modification calculation and the function of address modification calculation. Therefore, by storing arbitrary base offset data in the base offset register group and by storing arbitrary data in data 2 (d) of the input data packet, each data packet can be transmitted to a desired one of the video memories. Since the data packet output from one or more data driven type processors can be branched to any desired video memory, load on each video memory can be reduced.

In addition, since each of the video memories 41, 42, 43 and 44 can be accessed with the address designated by using the function of global offset modification calculation and the function of address modification calculation, neighborhood processing around the address shifted from the address indicated by the generation number can be performed. As mentioned above, such neighborhood processing is frequently used in image processing. Therefore, the data driven type information processing apparatus is especially suitable for image processing. Since a plurality of video memories and a plurality of data driven type processors can be used, a large amount of data can be processed without concentration of load on individual video memory or processor.

When either the global offset modification calculation or the address modification calculation function is employed, the range of addresses which can be designated is made smaller. However, even in that case, the data driven type information processing apparatus of the present invention facilitates image processing as compared with the data driven type information processing apparatus which does not have either of these functions.

The data driven type information processing apparatus of the above described embodiments includes four data driven type processors and four video memories. However, when the router shown in FIG. 10 is used, data packets can be transmitted from an arbitrary number of data driven type processors to an arbitrary number of video memories. Although routers shown in the above embodiments each have two inputs and two outputs, it should not be understood as limiting.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus, comprising:
   a plurality of data driven type processing means for internally processing a data packet based on a data flow program and for outputting the processed data packet;
   a plurality of external memories accessible by each of said plurality of data driven type processing means; and
   first path selecting means, connecting said plurality of data driven type processing means to said plurality of external memories and receiving the output data packet, for selecting a path for directly applying said output data packet selectively to any of said plurality of external memories,
said first path selecting means simultaneously providing a plurality of paths between said plurality of data driven type processing means and said plurality of external memories.

2. The data driven type information processing apparatus according to claim 1, wherein
   said first path selecting means includes
      address calculating means for calculating an address to be accessed by said data packet in said plurality of external memories based on the content of said data packet, and
      branching means for branching the path of said applied data packet based on the address calculated by said addressing calculating means.

3. The data driven type information processing apparatus according to claim 2, wherein
   said first path selecting means includes:
      a plurality of said address calculating means;
      a plurality of said branching means,
      each of said plurality of branching means corresponding to a respective one of said plurality of address calculating means; and
      merging means for merging and outputting outputs from different ones of said plurality of branching means.

4. The data driven type information processing apparatus according to claim 3, wherein
   said branching means includes means for determining destination of branching of the data packet based on the address calculated by said address calculating means,
   a plurality of output means provided corresponding to a plurality of destinations, and
   gate means for outputting the input data packet by selecting one of said plurality of output means in accordance with the result of determination by said means for determining destination.

5. The data driven type information processing apparatus according to claim 1, wherein
   said first path selecting means includes merging means having a plurality of data packet inputs for merging and outputting data packets provided through said plurality of data packet inputs onto a single data packet path.

6. The data driven type information processing apparatus according to claim 5, further comprising
   second path selecting means receiving a data packet output from any of said plurality of external memories for selecting a path for selectively applying said data packet to any of said plurality of data driven type processing means.

7. The data driven type information processing apparatus according to claim 6, wherein
   said second path selecting means includes
      address calculating means for calculating an address to be accessed by said data packet in said plurality of data driven type processing means based on the content of said data packet, and
      branching means for branching the path of said applied data packet based on the address calculated by said address calculating means.

8. The data driven type information processing apparatus according to claim 7, wherein
   said second path selecting means includes:
      a plurality of said address calculating means;
      a plurality of said branching means,
      each of said plurality of branching means corresponding to a respective one of said plurality of address calculating means; and
      merging means for merging and outputting outputs of different ones of said plurality of branching means.

9. The data driven type information processing apparatus according to claim 6, wherein
   said second path selecting means includes merging means having a plurality of data packet inputs for merging and outputting data packets applied through said plurality of data packet inputs onto a single data packet path.

10. The data driven type information processing apparatus according to claim 1, further comprising second path selecting means receiving a data packet output from said plurality of external memories for selecting a path for selectively applying said data packet to any of said plurality of data driven type processing means.

11. The data driven type information processing apparatus according to claim 10, wherein said second path selecting means includes address calculating means for calculating an address to be accessed by said data packet in said plurality of data driven type processing means based on the content of said data packet, and branching means for branching the path of said applied data packet based on the address calculated by said address calculating means.

12. The data driven type information processing apparatus according to claim 11, wherein said second path selecting means includes:

a plurality of said address calculating means, a plurality of said branching means, each of said plurality of branching means corresponding to a respective one of said plurality of address calculating means; and merging means for merging and outputting output of different ones of said plurality of branching means.

13. The data driven type information processing apparatus according to claim 10, wherein said second path selecting means includes merging means having a plurality of data packet inputs for merging and outputting data packets applied through said plurality of inputs onto a single data packet path.

14. The data driven type information processing apparatus of claim 1, wherein each of said data driven type processing means includes:

a program memory;

a firing control unit operatively associated with said program memory, for outputting a data packet;

a calculation control unit operating on an applied data packet in accordance with instruction information included in the applied data packet; and a data branching unit for selectively applying the data packet output by said firing control unit to said calculation control unit or toward an external output terminal; and wherein said first path selecting means receives the data packet applied to the external output terminal.

15. A data driven type information processing apparatus comprising:

at least one data driven type processing means for processing a data packet based on a data flow program;

a plurality of external memories accessible by each of said at least one data driven type processing means; and first path selecting means, connecting said at least one data driven type processing means to said plurality of external memories, and receiving the data packet processed by said at least one data driven type processing means, for selecting a path for directly applying said processed data packet selectively to any of said plurality of external memories, said first path selecting means simultaneously providing a plurality of paths between said at least one data driven type processing means and said plurality of external memories.

16. A data driven type information processing apparatus, comprising:

a plurality of data driven type processing means for processing a data packet based on a data flow program;

at least one external memory accessible by each of said plurality of data driven type processing means; and first path selecting means, connecting said plurality of data driven type processing means to said at least one external memory and receiving the data packet processed by said plurality of data driven type processing means, for selecting a path for directly applying said processed data packet selectively to any of said at least one external memory, said first path selecting means simultaneously providing a plurality of paths between said plurality of data driven type processing means and said at least one external memory.

* * * * *